(12) United States Patent
Graham et al.

(10) Patent No.: US 10,822,851 B2
(45) Date of Patent: Nov. 3, 2020

(54) COVER ASSEMBLY WITH LID ASSIST ASSEMBLY AND FRICTION BEARING

(71) Applicant: Weber Knapp Company, Jamestown, NY (US)

(72) Inventors: Daniel Mark Graham, Ashville, NY (US); Warren Arthur Waxham, Lexington, KY (US); Jeremy Forrest Redlecki, Clymer, NY (US)

(73) Assignee: Weber Knapp Company, Jamestown, NY (US)

( * ) Notice: Subject to any disclaimer, the term of this patent is extended or adjusted under 35 U.S.C. 154(b) by 31 days.

(21) Appl. No.: 16/207,146

(22) Filed: Dec. 2, 2018

(65) Prior Publication Data

US 2020/0173211 A1    Jun. 4, 2020

(51) Int. Cl.
| | |
|---|---|
| *E05D 11/08* | (2006.01) |
| *E05D 3/02* | (2006.01) |
| *E05F 3/16* | (2006.01) |

(52) U.S. Cl.
CPC ............. *E05D 11/081* (2013.01); *E05D 3/02* (2013.01); *E05F 3/16* (2013.01); *E05Y 2201/224* (2013.01); *E05Y 2201/488* (2013.01); *E05Y 2201/492* (2013.01); *E05Y 2900/60* (2013.01); *Y10T 16/5403* (2015.01)

(58) Field of Classification Search
CPC .. E05D 11/081; E05D 3/02; E05F 3/16; E05F 3/20; E05F 1/10; E05F 5/02; E05Y 2201/224; E05Y 2201/488; E05Y 2201/492; E05Y 2900/60; F16F 7/04; A47J 37/0704; B65F 1/1623; Y10S 16/10; Y10T 16/304; Y10T 16/5403; Y10T 16/54033; Y10T 16/54034; Y10T 16/540345; Y10T 16/54035; Y10T 16/54038; Y10T 16/593; Y10T 16/625
USPC ................. 16/337–342, DIG. 10, 50, 72, 85; 188/130; 126/25 R
See application file for complete search history.

(56) References Cited

U.S. PATENT DOCUMENTS

| | | | | |
|---|---|---|---|---|
| 1,620,701 | A | | 3/1927 | Teich |
| 2,308,966 | A | | 1/1941 | Curt |
| 3,559,232 | A | * | 2/1971 | Crane ................... E05D 11/081 16/50 |
| 3,734,076 | A | * | 5/1973 | Kiziol ..................... A47J 36/06 126/25 R |
| 3,806,987 | A | * | 4/1974 | Koziol .................... E05D 11/06 16/374 |
| 4,836,607 | A | * | 6/1989 | Kluting ................ B60N 2/2252 16/341 |

(Continued)

FOREIGN PATENT DOCUMENTS

| | | |
|---|---|---|
| CA | 3009636 A1 | 6/2017 |
| CA | 3010665 A1 | 7/2018 |

(Continued)

*Primary Examiner* — William L Miller
(74) *Attorney, Agent, or Firm* — Simpson & Simpson, PLLC; Michael Nicholas Vranjes

(57) ABSTRACT

A friction bearing for rotatably connecting a first component to a second component, including a spacer arranged to be non-rotatably connected to the first component, a first friction cone non-rotatably connected to the spacer, a housing arranged to engage the first friction cone and be non-rotatably connected to the second component, and a disc spring arranged to provide an axial force on the friction bearing.

20 Claims, 15 Drawing Sheets

(56) References Cited

U.S. PATENT DOCUMENTS

| | | | | | |
|---|---|---|---|---|---|
| 5,333,356 | A | * | 8/1994 | Katagiri | G06F 1/1616 16/340 |
| 5,572,768 | A | * | 11/1996 | Daul | E05F 1/1215 16/49 |
| 5,605,208 | A | | 2/1997 | Freidrichsen et al. | |
| 2002/0112319 | A1 | * | 8/2002 | Kida | G06F 1/1616 16/342 |
| 2005/0183235 | A1 | * | 8/2005 | Markl | E05D 11/081 16/82 |
| 2009/0056076 | A1 | * | 3/2009 | Goller | E05D 11/084 16/342 |
| 2011/0099759 | A1 | | 5/2011 | Chang | |

FOREIGN PATENT DOCUMENTS

| | | |
|---|---|---|
| FR | 2905997 | 9/2014 |
| GB | 454098 | 3/1935 |
| GB | 805991 A | 12/1958 |
| WO | 2017/112936 | 6/2017 |
| WO | WO20170099759 A1 | 7/2018 |

\* cited by examiner

US 10,822,851 B2

COVER ASSEMBLY WITH LID ASSIST ASSEMBLY AND FRICTION BEARING

FIELD

The present disclosure relates to hinged cover assemblies, and more particularly, to cover assemblies having a friction bearing connecting the cover to the base, and even more particularly, to cover assemblies having a friction bearing and a lid assist assembly.

BACKGROUND

A barbecue grill is a device that cooks food by applying heat from below. Many grills comprise a base, which houses either the gas burners or charcoal, and a lid. The lid is hingedly connected to the base. The hinged connection between the lid and the base enables the lid to be closed to trap the heat, as well as opened to add, remove, or check on the food. However, as the development of grill technology advances, the demand for grills having dense or heavy covers has increased. For example, customers prefer the look of stainless steel, which is generally a dense metal. Additionally, certain types of dense metal may have better heat transfer qualities, that is, heat cannot escape from the cooking area as quickly. The use of such dense materials in grills has made the opening and closing of the lid much more difficult. Furthermore, controlling the movement of the lid relative to the base has also become much more difficult.

Thus, there is a long felt need for a cover assembly having a friction bearing to control the rotational movement of the lid relative to the base. There is also a long felt need for a cover assembly having a lid assist assembly to aid in the opening and closing of the lid relative to the base.

SUMMARY

According to aspects illustrated herein, there is provided a friction bearing for rotatably connecting a first component to a second component, comprising a spacer arranged to be non-rotatably connected to the first component, a first friction cone non-rotatably connected to the spacer, a housing arranged to engage the first friction cone and be non-rotatably connected to the second component, and a disc spring arranged to provide an axial force on the friction bearing.

According to aspects illustrated herein, there is provided a cover assembly, comprising a base, and a lid rotatably connected to the base via a friction bearing, the friction bearing comprising a spacer arranged to be non-rotatably connected to the base, a first friction cone non-rotatably connected to the spacer, a housing arranged to engage the first friction cone and be non-rotatably connected to the lid, and a disc spring arranged to provide an axial force on the friction bearing.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

By "non-rotatably connected" elements, we mean that: the elements are connected so that whenever one of the elements rotate, all the elements rotate; and relative rotation between the elements is not possible. Radial and/or axial movement of non-rotatably connected elements with respect to each other is possible, but not required. By "rotatably connected" elements, we mean that the elements are rotatable with respect to each other.

Figure 1:
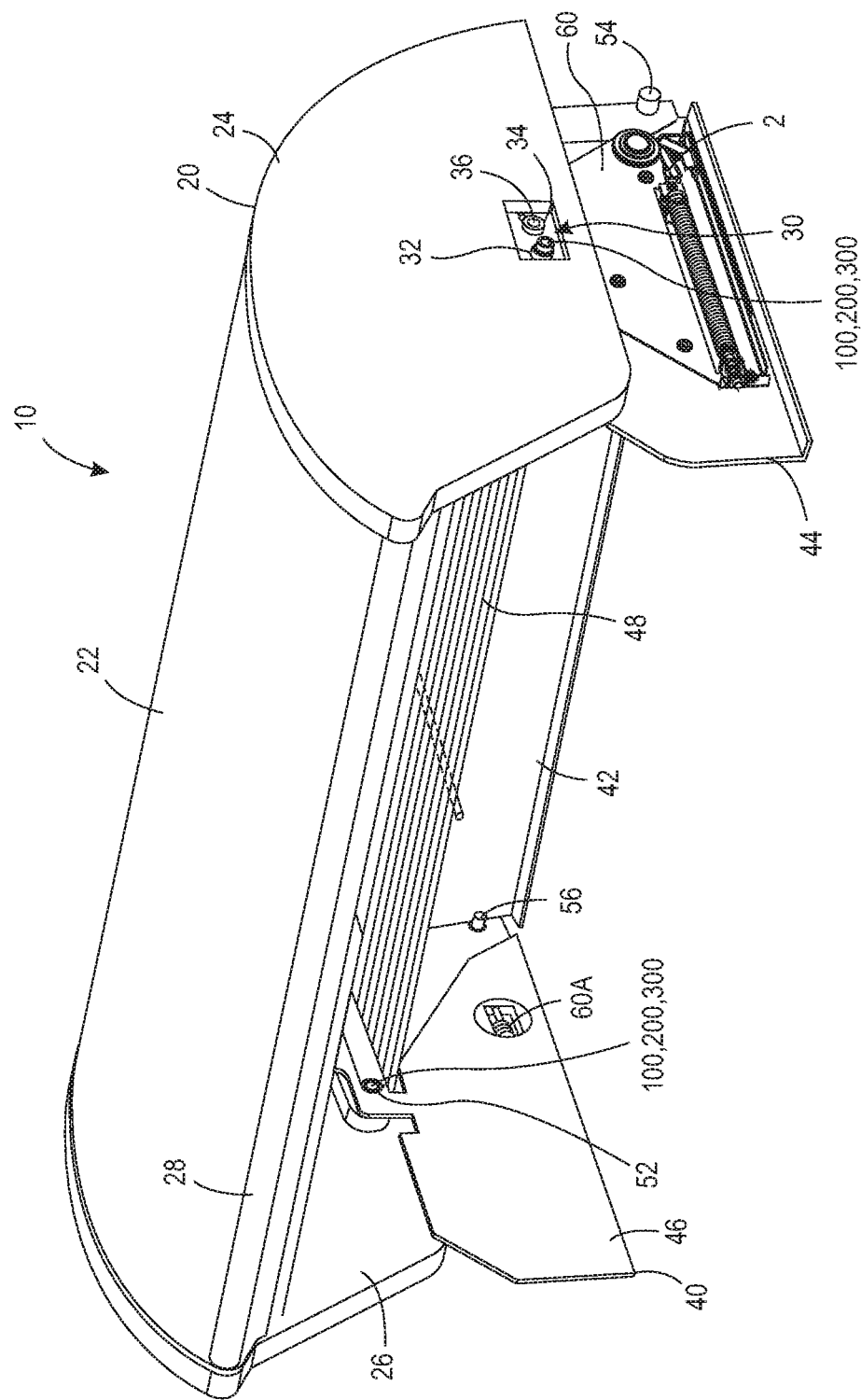
FIG. 1 is a perspective view of a cover assembly.
Figure 2:
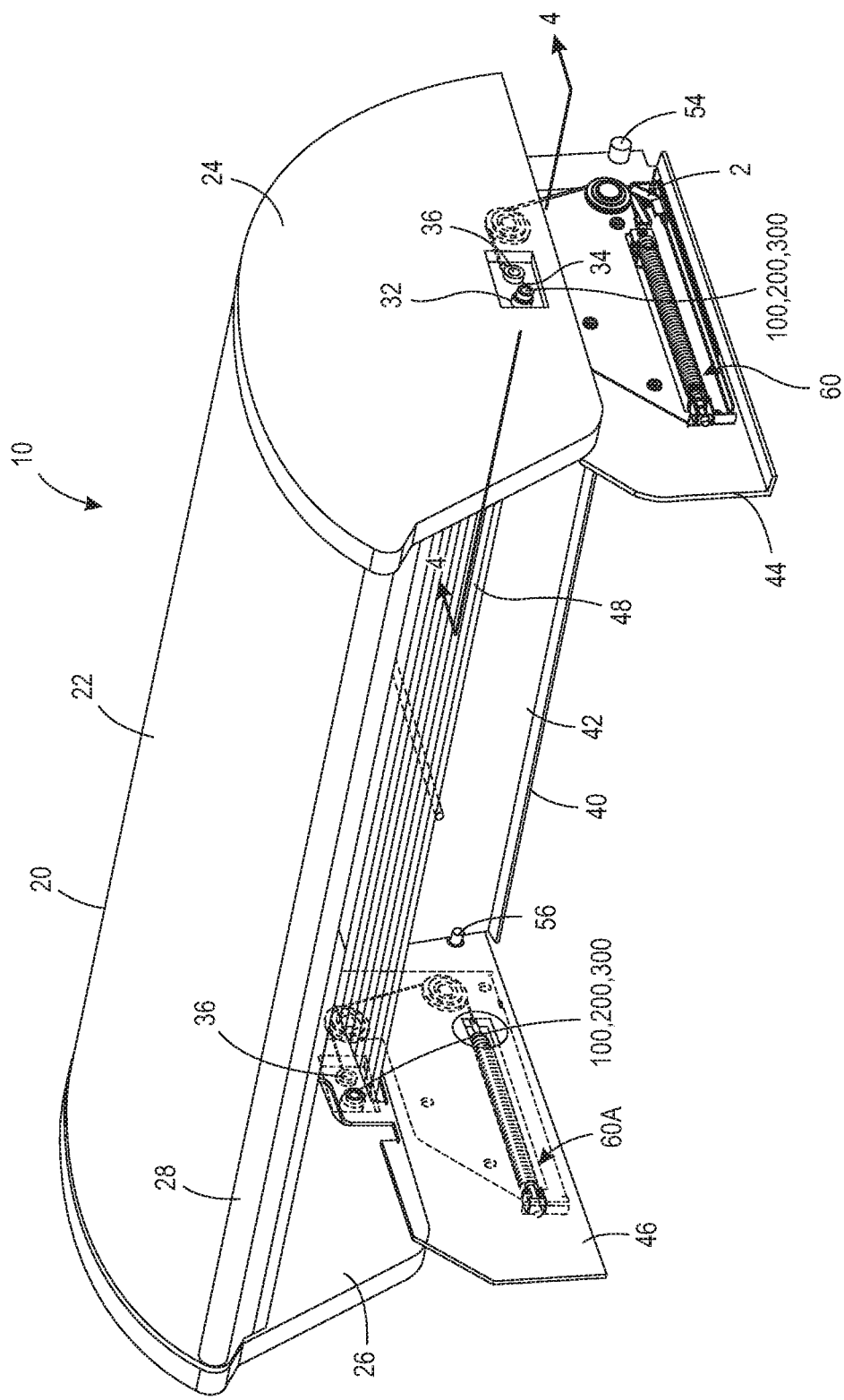
FIG. 2 is a perspective view of the cover assembly shown in FIG. 1.
Figure 3:
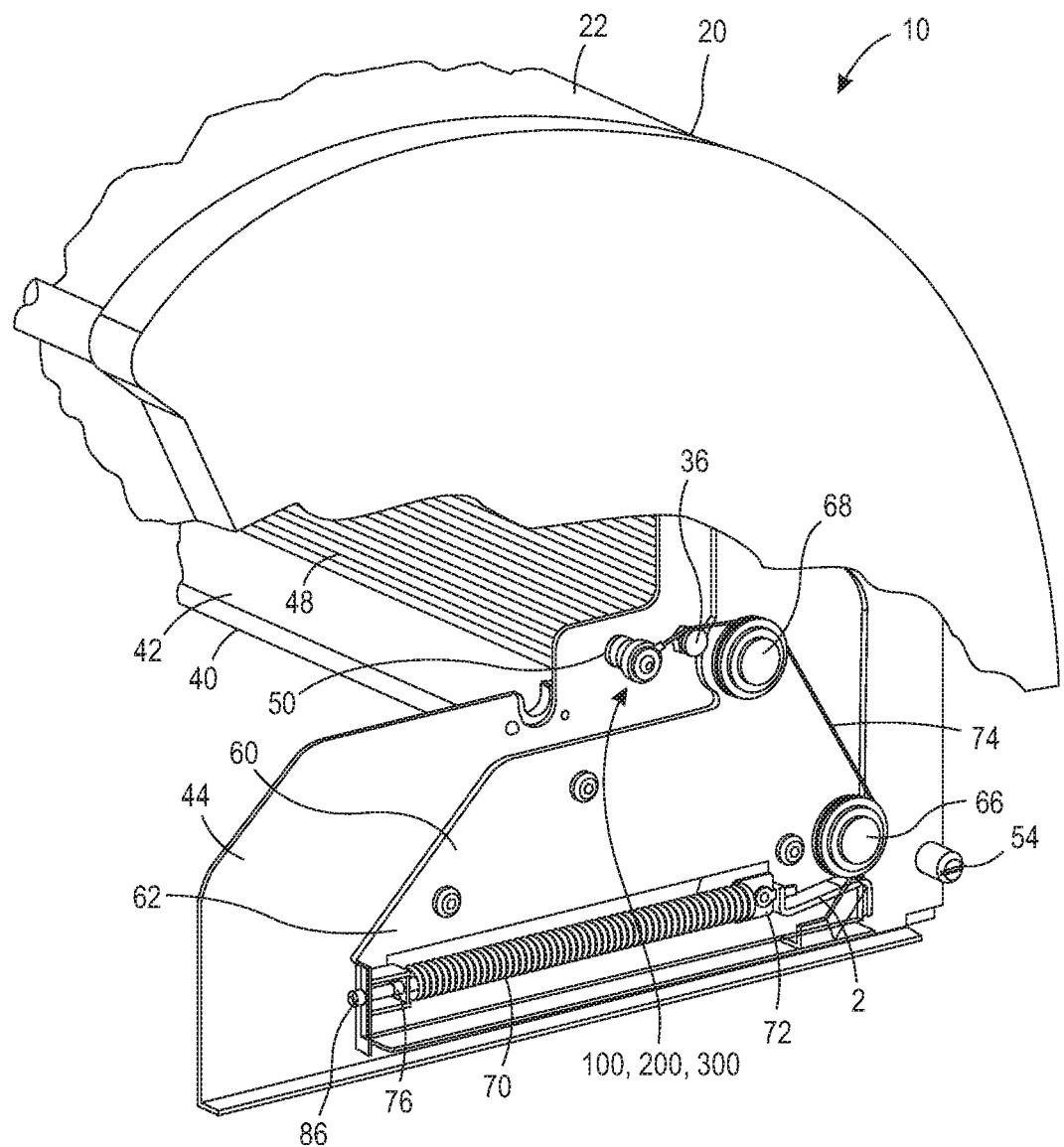
FIG. 3 is an enlarged perspective view of the cover assembly shown in FIG. 1.
Figure 4:
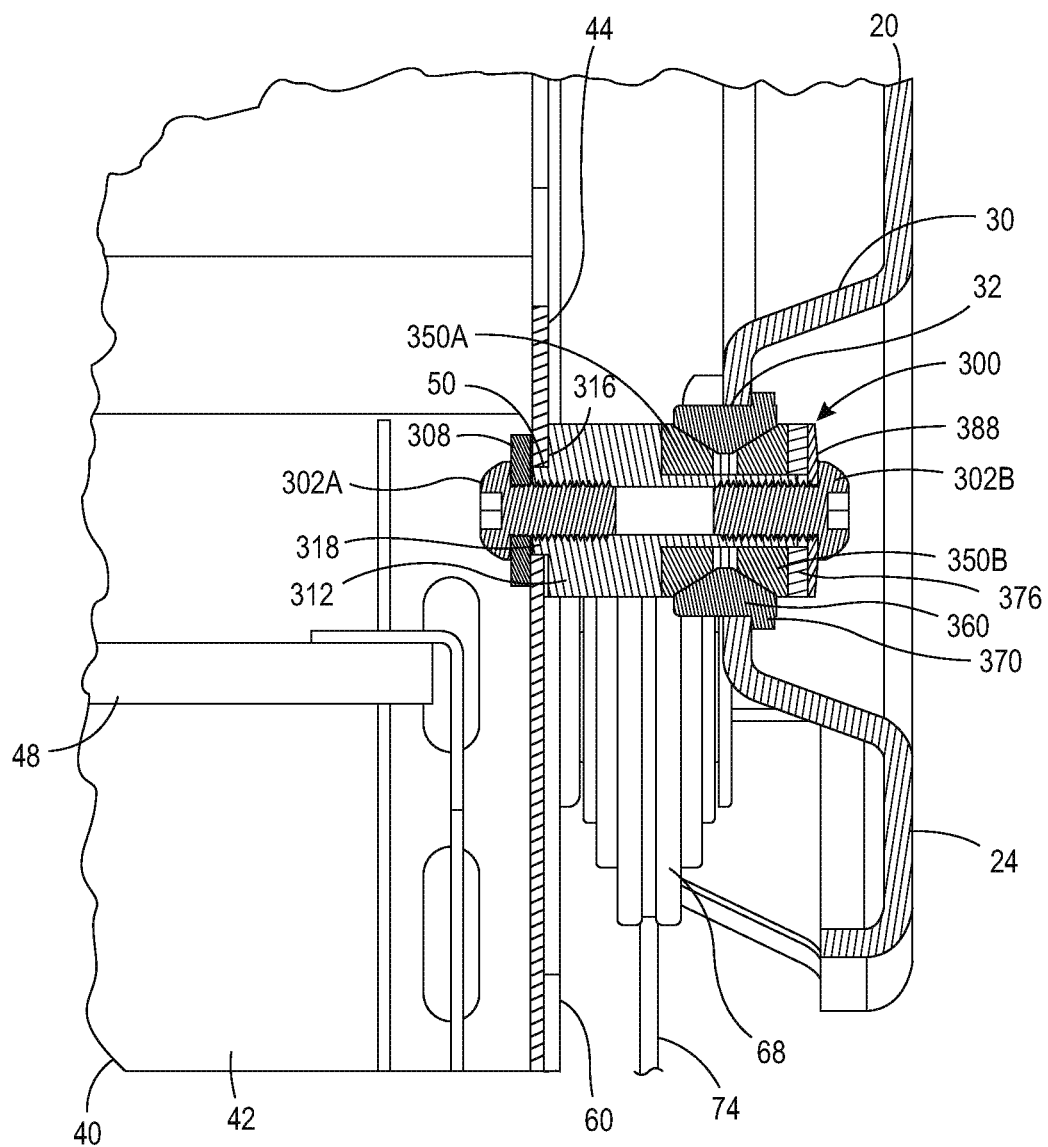
FIG. 4 is a cross-sectional view of the cover assembly taken generally along line 4-4 in FIG. 2.

Referring now to the figures, FIG. 1 is a perspective view of cover assembly 10. FIG. 2 is a perspective view of cover assembly 10, with side 24, side 26, base 40, and the plate of lid assist assembly 60A shown translucently. FIG. 3 is an enlarged perspective view of cover assembly 10 with side 24 removed. FIG. 4 is a cross-sectional view of cover assembly 10 taken generally along line 4-4 in FIG. 2. Cover assembly 10 generally comprises lid 20, base 40, lid assist assembly 60, and friction bearing 100, 200, 300. Cover assembly 10 may be, for example, barbecue grill for cooking. However, it should be appreciated that cover assembly 10 may be implemented in any device or assembly that utilizes a retractable lid, and that the present disclosure should not be limited to use only with barbecue grills. The following descriptions should be read in view of FIGS. 1-4.

Lid 20 comprises top 22, side 24, side 26, and handle 28. Side 24 comprises indentation 30, which includes hole 32 and hole 34. Hole 32 is arranged to align with hole 50 of base 40 such that lid 20 can be hingedly connected to base 40 via friction bearing 100, 200, 300. Hole 32 may comprise one or more protrusions designed to engage one or more notches 168, 268, 368 on radially outward facing surface 166, 266, 366, to non-rotatably connect lid 20 with housing 160, 260, 360 of friction bearings 100, 200, 300, respectively, as will be discussed in greater detail below. It should be appreciated that any suitable method of non-rotatably connecting lid 20 to housing 160, 260, 360 may be used, for example, screws, rivets, bolts, adhesives, welding, soldering, interference or press fit, etc. In some embodiments, radially outward facing surface 166, 266, 366 comprises threading operatively arranged to engage threading of hole 32 such that, when fully secured, lid 20 is non-rotatably connected to housing 160, 260, 360. Pivot 36 is arranged in hole 34. Pivot 36 is generally a bolt or pin that extends through hole 34 such that cable 74 can connect thereto. Specifically, cable 74 connects to pivot 36 to connect lid assist assembly 60 to lid 20, as will be discussed in greater detail below. In some embodiments, pivot 36 is non-rotatably connected to side 24. In some embodiments, hole 34 comprises one or more flats which engage one or more flats on pivot 36. In some embodiments, pivot 36 is a bolt that is secured in hole 34 via a nut, and further comprises a portion that extends axially past the nut onto which cable 74 is secured. It should be appreciated that any suitable means to connect cable 74 to lid 20 to assist in the opening and closing of lid 20 may be used, for example, screws, rivets, bolts, pins, welding, soldering, adhesives, etc.

Side 26 is substantially a mirror image of side 24, as is clearly shown in FIG. 2. Side 26 comprises an indentation having a first hole that aligns with hole 52 of base 40 for friction assembly bearing 100, 200, 300, and a second hole for pivot 36 to which a cable of lid assist assembly 60A is connected.

Base 40 comprises back 42, side 44, side 46, and grill 48. As previously discussed, side 44 comprises hole 50 arranged to align with hole 32. Friction bearing 100, 200, 300 extends through holes 50 and 32 to rotatably connect lid 20 to base 40. Hole 50 is operatively arranged to non-rotatably connect spacer 112, 212, 312 of friction bearing 100, 200, 300, respectively, to base 40. In some embodiments, protrusion 118, 218, 318 of spacer 112, 212, 312 engages hole 50 for a non-rotatable connection. For example, protrusion 118, 218, 318 may comprise a square geometry which engages the square geometry of hole 50. In some embodiments, protrusion 118, 218, 318 comprises one or more flats which engage one or more flats of hole 50. It should be appreciated that protrusion 118, 218, 318 or spacer 112, 212, 312 may comprise any suitable geometry to non-rotatably connect base 40 to spacer 112, 212, 312, for example, rectangular, triangular, trapezoidal, ellipsoidal, ovular, etc. In some embodiments, another suitable means for non-rotatably connecting spacer 112, 212, 312 to base 20 may be used, for example, rivets, screws, bolts, welding, soldering, etc. In some embodiments, side 44 further comprises stopper 54, which is operatively arranged to interfere with side 24 of lid 20 to limit rotational displacement of lid 20 relative to base 40. In some embodiments, stopper 54 is secured to side 44 via a bolt and nut connection; however, it should be appreciated that stopper 54 may be connected to side 44 via any suitable method, for example, screw, rivet, press fit, interference fit, welding, soldering, etc.

Similarly, side 46 comprises hole 52 arranged to align with the first hole of side 26. Friction bearing 100, 200, 300 extends through hole 52 and the first hole of side 26 to rotatably connect lid 20 to base 40. Hole 52 is operatively arranged to non-rotatably connect spacer 112, 212, 312 of friction bearing 100, 200, 300, respectively, to base 40. In some embodiments, protrusion 118, 218, 318 of spacer 112, 212, 312 engages hole 52 for a non-rotatable connection. For example, protrusion 118, 218, 318 may comprise a square geometry which engages the square geometry of hole 52. In some embodiments, protrusion 118, 218, 318 comprises one or more flats which engage one or more flats of hole 52. It should be appreciated that protrusion 118, 218, 318 or spacer 112, 212, 312 may comprise any suitable geometry to non-rotatably connect base 40 to spacer 112, 212, 312, for example, rectangular, triangular, trapezoidal, ellipsoidal, ovular, etc. In some embodiments, another suitable means for non-rotatably connecting spacer 112, 212, 312 to base 20 may be used, for example, rivets, screws, bolts, welding, soldering, etc. In some embodiments, side 46 further comprises stopper 56, which is operatively arranged to interfere with side 26 of lid 20 to limit rotational displacement of lid 20 relative to base 40. In some embodiments, stopper 56 is secured to side 46 via a bolt and nut connection; however, it should be appreciated that stopper 56 may be connected to side 46 via any suitable method, for example, screw, rivet, press fit, interference fit, welding, soldering, etc.

As shown in FIG. 4, lid 20 is rotatably connected to base 40 via friction bearing 300. Protrusion 318 of spacer 312 engages hole 50 of side 44, non-rotatably connecting spacer 312 to base 40. Spacer 312 is further axially secured via washer 308 and bolt 302A. Housing 360 engages hole 32 of side 24, non-rotatably connecting housing 360 to lid 20 (specifically, protrusions in hole 32 engage notches 368 arranged on radially outward facing surface 366 of housing 360, as will be discussed in greater detail below). Housing 360 is axially limited via friction cones 350A-B, flange washer 376, disc spring 288, and bolt 302B, as will be discussed in greater detail below. A mirror image configuration is arranged on the opposite side of cover assembly 20.

Figure 5:
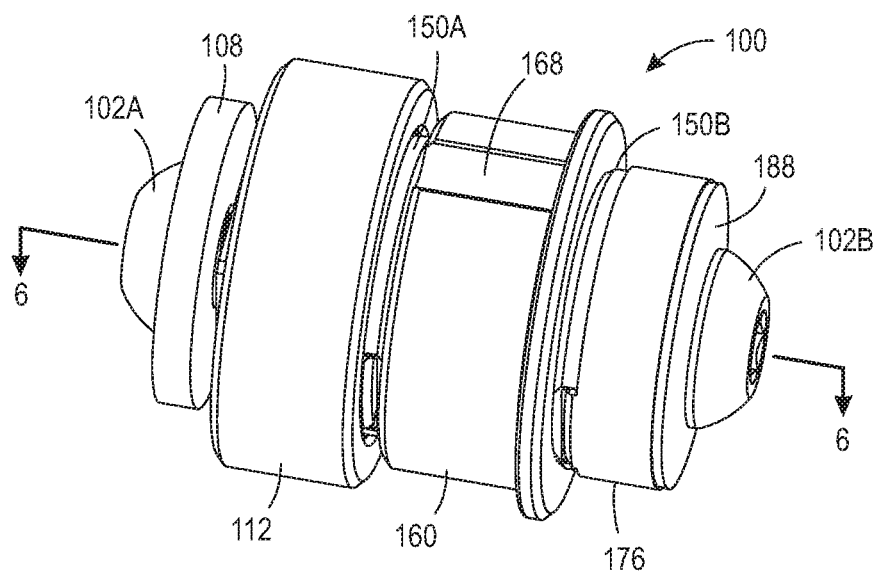
FIG. 5 is a perspective view of a friction bearing.
Figure 6:
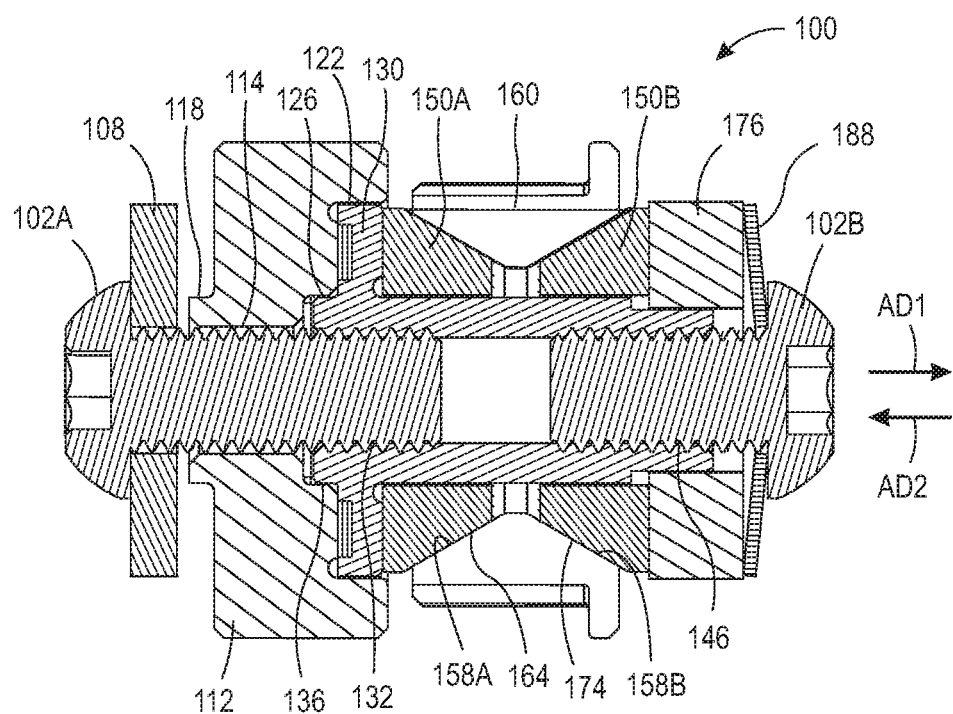
FIG. 6 is a cross-sectional view of the friction bearing taken generally along line 6-6 in FIG. 5.
Figure 7A:
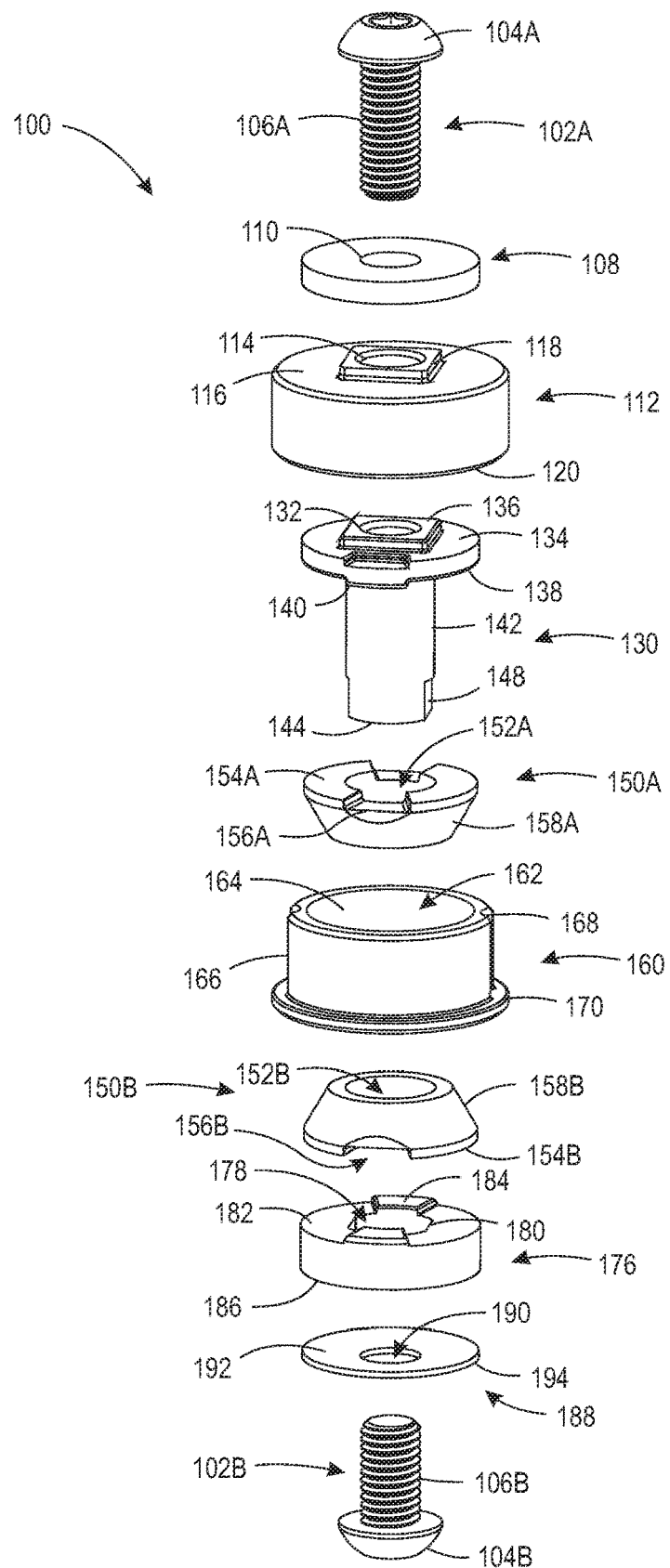
FIG. 7A is an exploded front perspective view of the friction bearing shown in FIG. 5.
Figure 7B:
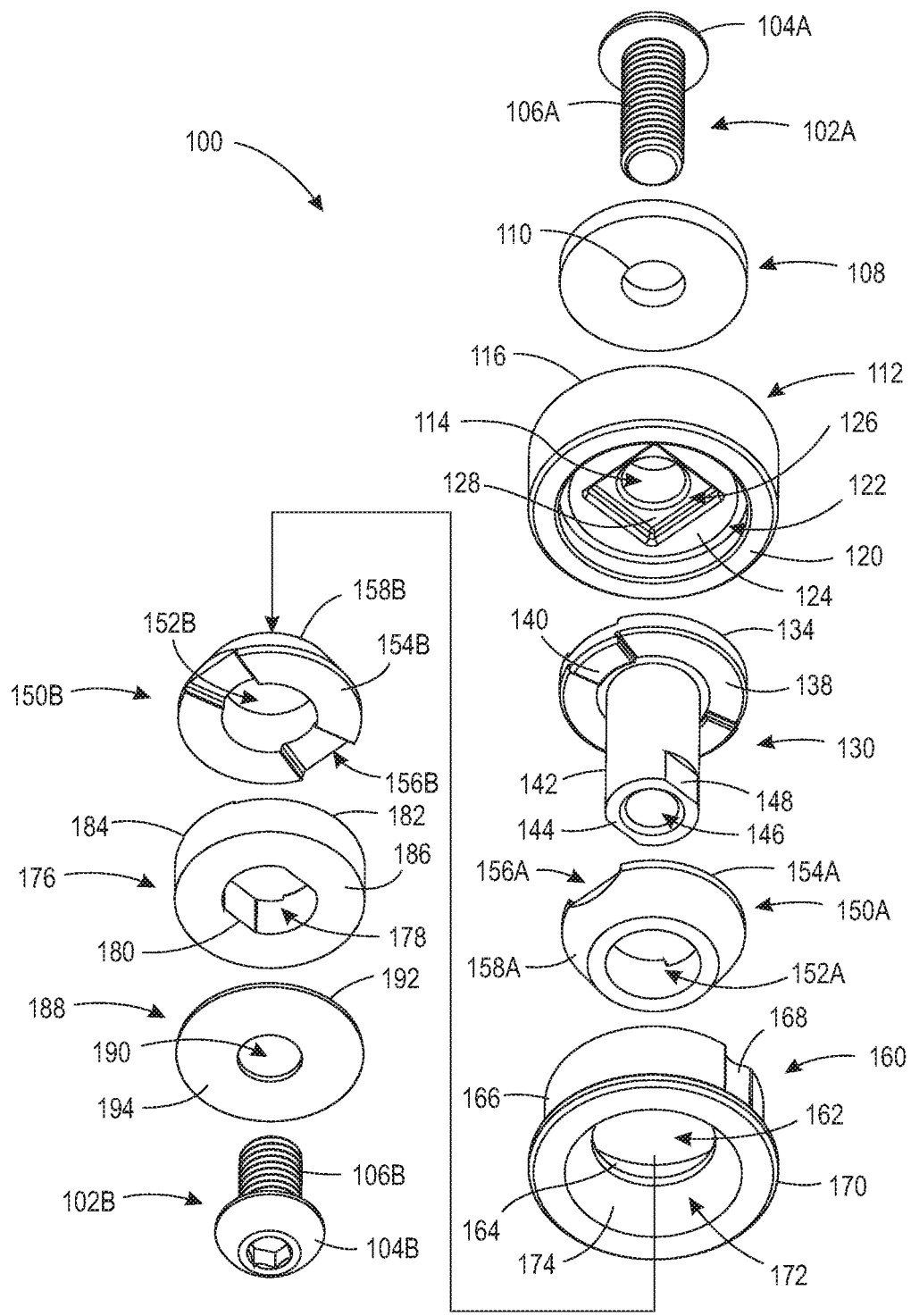
FIG. 7B is an exploded rear perspective view of the friction bearing shown in FIG. 5.

FIG. 5 is a perspective view of friction bearing 100. FIG. 6 is a cross-sectional view of friction bearing 100 taken generally along line 6-6 in FIG. 5. FIG. 7A is an exploded front perspective view of friction bearing 100. FIG. 7B is an exploded rear perspective view of friction bearing 100.

Friction bearing 100 generally comprises bolt 102A, washer 108, spacer 112, shaft 130, friction cone 150A, housing 160, friction cone 150B, washer 176, disc spring 188, and bolt 102B. The following descriptions should be read in view of FIGS. 5-7B.

Bolt 102A generally comprises head 104A and threading 106A. Threading 106A is arranged to extend through through-bore 110 of washer 108 and through-bore 114 of spacer 112 and engage threading of hole 132.

Spacer 112 generally comprises through-bore 114, surface 116, protrusion 118 extending from surface 116, surface 120, hole 122, and hole 126. As previously discussed, protrusion 118 engages hole 50 (e.g., having a square geometry) of base 40 to non-rotatably connect spacer 112 to base 40. Bolt 102A, washer 108, and shaft 130 axially secure or clamp spacer 112 to side 44. Hole 122 is generally circular and extends axially from surface 120 forming surface 124. Hole 126 is generally square and extends axially from surface 124 forming surface 128. It should be appreciated that holes 122 and 126 may comprise any suitable geometry.

Shaft 130 comprises hole 132, surface 134, protrusion 136 extending from surface 134, surface 138, one or more protrusions 140 extending from surface 138, section 142 extending from surface 138, surface 144, and hole 146. Hole 132 may comprise threading arranged to engage threading 106A of bolt 102A. In some embodiments, bolt 102A engages hole 132 via press or interference fit. Protrusion 136 is arranged to engage hole 126 such that surface 134 abuts against or is arranged substantially proximate to surface 124. In some embodiments, protrusion 136 comprises a square geometry to engage hole 126 and non-rotatably connect shaft 130 to spacer 112. Hole 146 comprises threading arranged to engage threading 106B of bolt 102B. Section 142 may further comprise one or more flats 148 circumferentially arranged thereon proximate surface 144.

Friction cone 150A comprises through-bore 152A, surface 154A, one or more notches 156A arranged on surface 154A, and radially outward facing surface 158A. When assembled, through-bore 152A is arranged to engage section 142 and one or more notches 156A are arranged to engage one or more protrusions 140 such that surface 154A abuts against or is arranged substantially proximate to surface 138. The engagement of notches 156A with protrusions 140 non-rotatably connect friction cone 150A with shaft 130, spacer 112, and base 40. Radially outward facing surface 158A is frusto-conical. Specifically, as shown in FIG. 6, radially outward facing surface 158A linearly decreases in diameter in axial direction AD1. In some embodiments, radially outward facing surface 158A is curvilinear (i.e., non-linearly decreases in diameter in axial direction AD1). In some embodiments, friction cone 150A is arranged at least partially on a first axial side of housing 160 and disc spring 188 is arranged on a second axial side of housing 160, opposite the first axial side.

Housing 160 comprises hole 162, radially inward facing surface 164, radially outward facing surface 166, one or more notches 168 circumferentially arranged on radially outward facing surface 166, flange 170, hole 172, and radially inward facing surface 174. Radially inward facing surfaces 164 and 174 are frusto-conical. Specifically, as shown in FIG. 6, radially inward facing surface 164 linearly decreases in diameter in axial direction AD1 and radially inward facing surface 174 linearly increases in diameter in axial direction AD1. In some embodiments, radially inward facing surfaces 164 and 174 are curvilinear (i.e., radially inward facing surface 164 non-linearly decreases in diameter in axial direction AD1 and radially inward facing surface 174 non-linearly increases in diameter in axial direction AD1). As previously discussed, housing 166 is arranged to engage hole 32 of lid 20 to non-rotatably connect lid 20 to housing 166. Specifically, notches 168 are arranged to engage protrusions of hole 32 to create the non-rotatable connection. Notches 168 extend axially along radially outward facing surface 166, thereby allowing axial movement of lid 20 relative to housing 160. Flange 170 limits the axial movement of lid 20 relative to housing 160, as shown in FIG. 4 (i.e., flange 370 of friction bearing 300 is substantially similar to flange 170 of friction bearing 100). In some embodiments, housing 160 is fixedly secured to lid 20.

Friction cone 150B comprises through-bore 152B, surface 154B, one or more notches 156B arranged on surface 154B, and radially outward facing surface 158B. When assembled, through-bore 152B is arranged to engage section 142. Radially outward facing surface 158B is frusto-conical. Specifically, as shown in FIG. 6, radially outward facing surface 158B linearly increases in diameter in axial direction AD1. In some embodiments, radially outward facing surface 158B is curvilinear (i.e., non-linearly increases in diameter in axial direction AD1).

Washer 176 comprises hole 178 having one or more flats 180, surface 182, one or more protrusions 184 arranged on surface 182, and surface 186. Protrusions 184 are arranged to engage notches 156B to non-rotatably connect washer 176 and friction cone 150B. Flats 180 are arranged to engage flats 148 to non-rotatably connect washer 176, friction cone 150B, and shaft 130.

Disc spring 188 comprises through-bore 190, surface 192, and surface 194. Disc spring 188 is a conical shell which can be loaded along its axis either statically or dynamically, also known as a Belleville washer, a coned-disc spring, conical spring washer, Belleville spring, or cupped spring washer. Specifically, disc spring 188 is a type of spring shaped like a washer having a frusto-conical shape that gives it its characteristic spring. Surface 192 engages surface 186 and surface 194 engages head 104B. Disc spring 188 provides continuous axial force to friction bearing 100 to maintain the non-rotatable connection between the relevant components of friction bearing 100.

Bolt 102B generally comprises head 104B and threading 106B. Threading 106B is arranged to extend through through-bore 190 of disc spring 188 and hole 178 of washer 176 and engage threading of hole 146. In some embodiments, bolt 102B engages hole 146 via press or interference fit.

When friction bearing 100 is assembled, washer 176, friction cone 150B, friction cone 150A, shaft 130, spacer 112, and base 40 are non-rotatably connected. Additionally, when friction bearing 100 is assembled, housing 160 and lid 20 are non-rotatably connected. The purpose of friction bearing 100 to make adjustable or further control the rate of displacement of lid 20 relative to base 40. Specifically, friction bearing 100 acts as an adjustable clutch to limit the rotational speed of lid 20 to base 40. As shown in FIG. 6, radially outward facing surface 158A engages radially inward facing surface 164 and radially outward facing surface 158B engages radially inward facing surface 174 thereby creating friction between friction cones 150A-B and housing 160. As bolt 102B is tightened, pressure created in friction bearing 100 forces, for example, friction cone 150A in axial direction AD1 and friction cone 150B in axial direction AD2, relative to housing 160, creating more friction between radially outward facing surfaces 158A-B and radially inward facing surfaces 164 and 174, respectively, and limiting the rate of displacement of lid 20 relative to base 40. Oppositely, as bolt 102B is loosened, pressure in friction bearing 100 is decreased creating less friction between radially outward facing surfaces 158A-B and radially inward facing surfaces 164 and 174, respectively, and allowing for an increased rate of displacement of lid 20 relative to base 40. Friction bearing 100 is advantageous especially for cover assemblies having very dense or heavy covers, which upon opening, may be very difficult to control.

Figure 8:
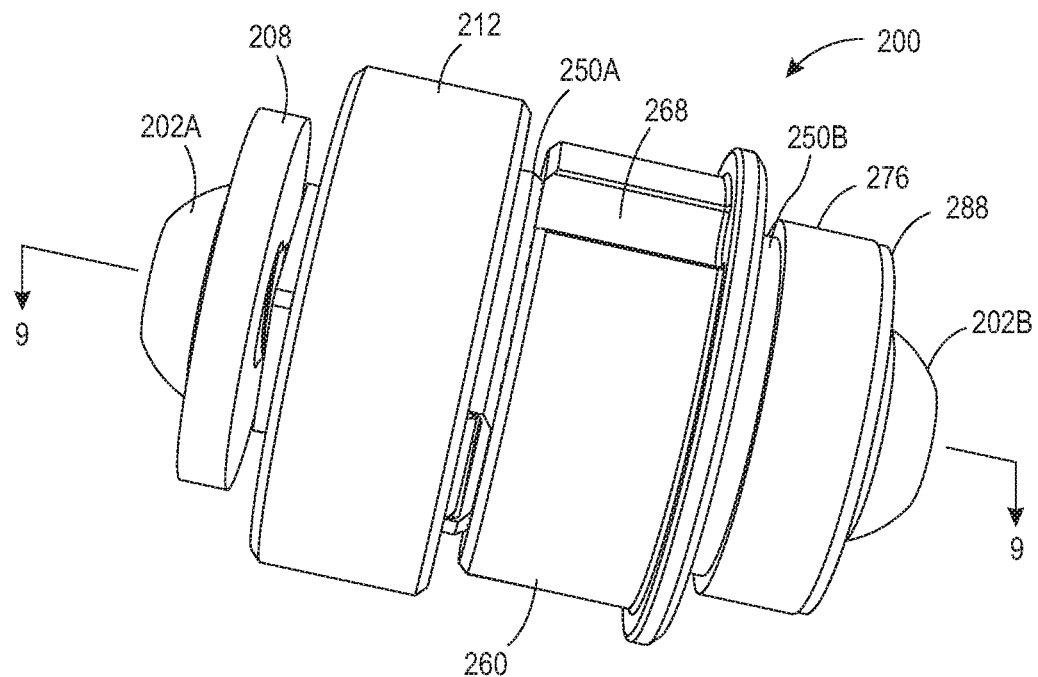
FIG. 8 is a perspective view of a friction bearing.
Figure 9:
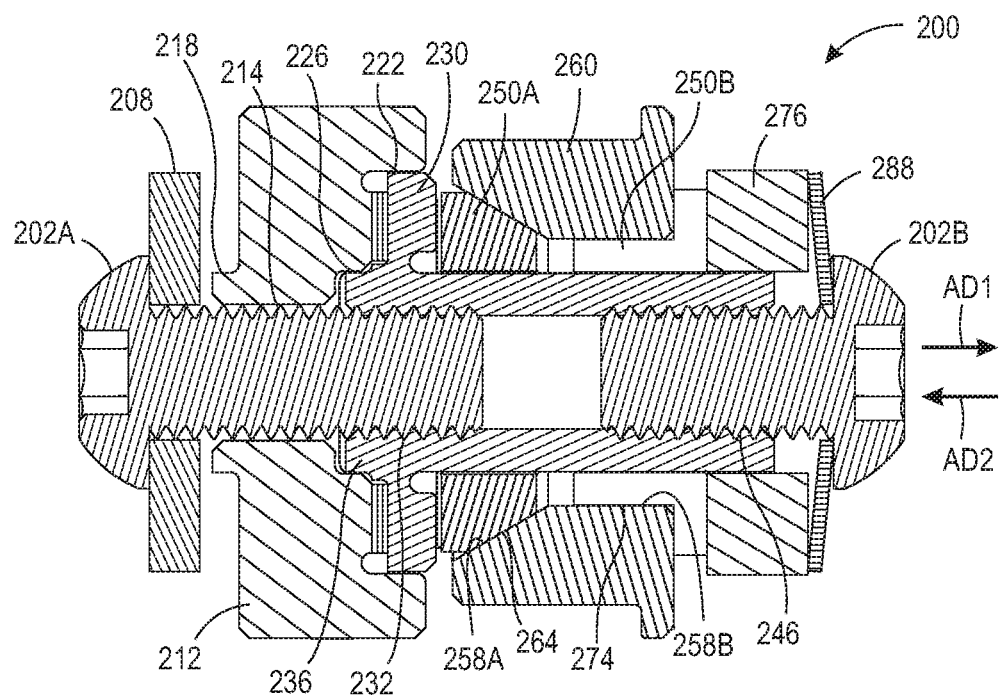
FIG. 9 is a cross-sectional view of the friction bearing taken generally along line 9-9 in FIG. 8.
Figure 10A:
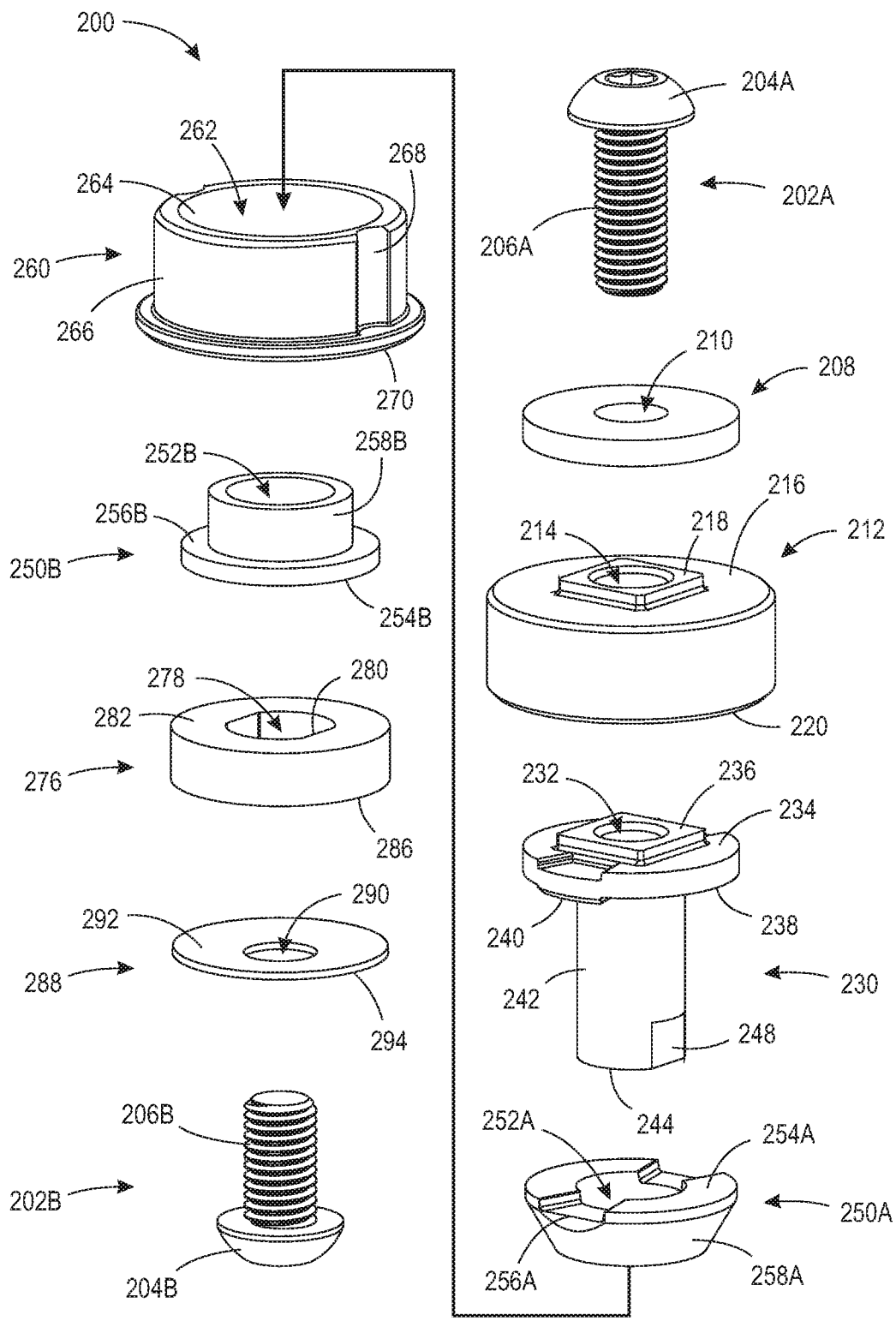
FIG. 10A is an exploded front perspective view of the friction bearing shown in FIG. 8.
Figure 10B:
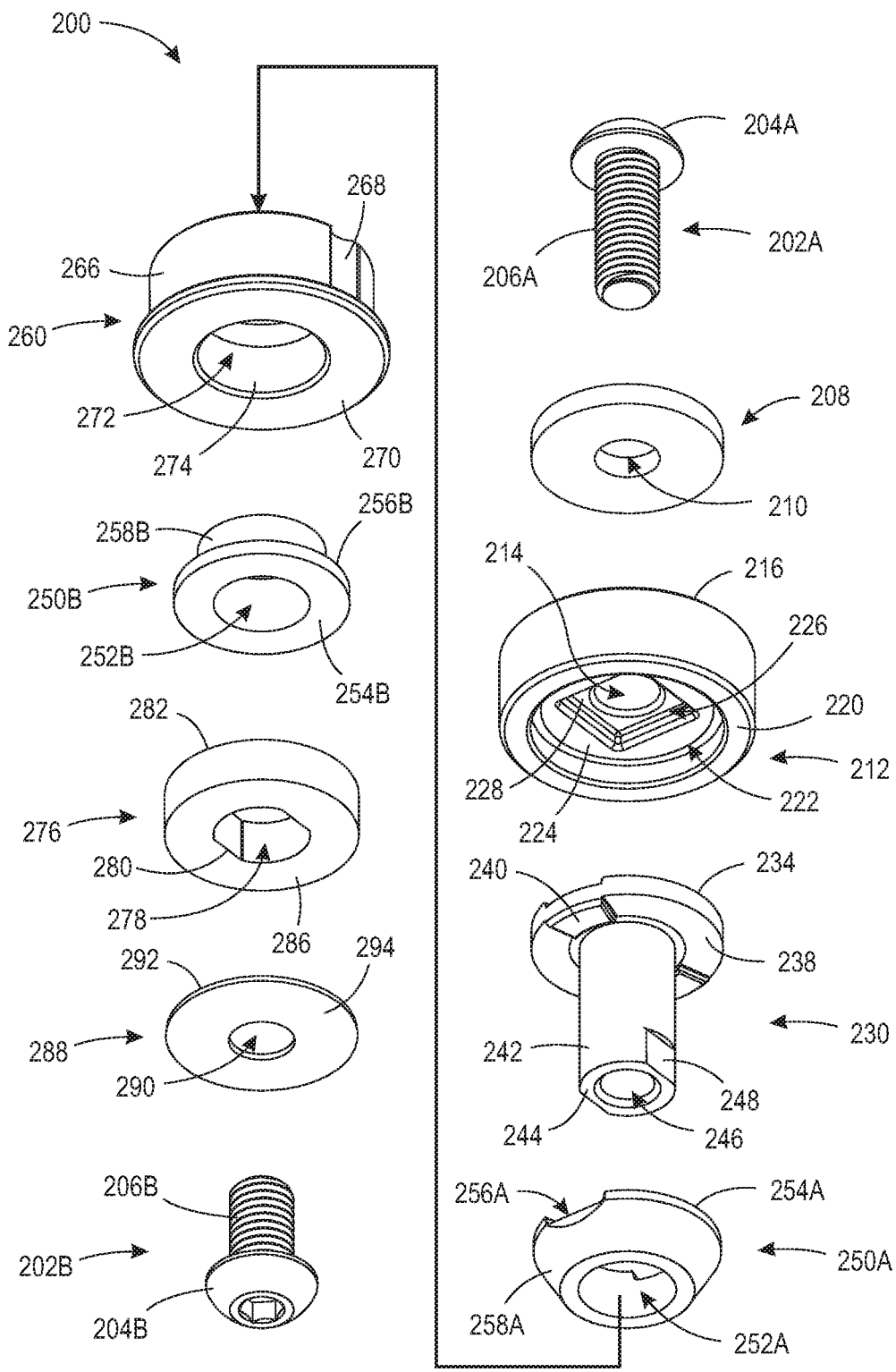
FIG. 10B is an exploded rear perspective view of the friction bearing shown in FIG. 8.

FIG. 8 is a perspective view of friction bearing 200. FIG. 9 is a cross-sectional view of friction bearing 200 taken generally along line 9-9 in FIG. 8. FIG. 10A is an exploded front perspective view of friction bearing 200. FIG. 10B is an exploded rear perspective view of friction bearing 200. Friction bearing 200 generally comprises bolt 202A, washer 208, spacer 212, shaft 230, friction cone 250A, housing 260, sleeve 250B, washer 276, disc spring 288, and bolt 202B. The following descriptions should be read in view of FIGS. 8-10B.

Bolt 202A generally comprises head 204A and threading 206A. Threading 206A is arranged to extend through through-bore 210 of washer 208 and through-bore 214 of spacer 212 and engage threading of hole 232.

Spacer 212 generally comprises through-bore 214, surface 216, protrusion 218 extending from surface 216, surface 220, hole 222, and hole 226. As previously discussed, protrusion 218 engages hole 50 (e.g., having a square geometry) of base 40 to non-rotatably connect spacer 212 to base 40. Bolt 202A, washer 208, and shaft 230 axially secure or clamp spacer 212 to side 44. Hole 222 is generally circular and extends axially from surface 220 forming surface 224. Hole 226 is generally square and extends axially from surface 224 forming surface 228. It should be appreciated that holes 222 and 226 may comprise any suitable geometry.

Shaft 230 comprises hole 232, surface 234, protrusion 236 extending from surface 234, surface 238, one or more protrusions 240 extending from surface 238, section 242 extending from surface 238, surface 244, and hole 246. Hole 232 may comprise threading arranged to engage threading 206A of bolt 202A. In some embodiments, bolt 202A engages hole 232 via press or interference fit. Protrusion 236 is arranged to engage hole 226 such that surface 234 abuts against or is arranged substantially proximate to surface 224. In some embodiments, protrusion 236 comprises a square geometry to engage hole 226 and non-rotatably connect shaft 230 to spacer 212. Hole 246 comprises threading arranged to engage threading 206B of bolt 202B. Section 242 may further comprise one or more flats 248 circumferentially arranged thereon proximate surface 244.

Friction cone 250A comprises through-bore 252A, surface 254A, one or more notches 256A arranged on surface 254A, and radially outward facing surface 258A. When assembled, through-bore 252A is arranged to engage section 242 and one or more notches 256A are arranged to engage one or more protrusions 240 such that surface 254A abuts against or is arranged substantially proximate to surface 238. The engagement of notches 256A with protrusions 240 non-rotatably connect friction cone 250A with shaft 230, spacer 212, and base 40. Radially outward facing surface 258A is frusto-conical. Specifically, as shown in FIG. 9, radially outward facing surface 258A linearly decreases in diameter in axial direction AD1. In some embodiments, radially outward facing surface 258A is curvilinear (i.e., non-linearly decreases in diameter in axial direction AD1). In some embodiments, friction cone 250A is arranged at least partially on a first axial side of housing 260 and disc spring 288 is arranged on a second axial side of housing 260, opposite the first axial side.

Housing 260 comprises hole 262, radially inward facing surface 264, radially outward facing surface 266, one or more notches 268 circumferentially arranged on radially outward facing surface 266, flange 270, hole 272, and radially inward facing surface 274. Radially inward facing surface 264 is frusto-conical. Specifically, as shown in FIG. 9, radially inward facing surface 264 linearly decreases in diameter in axial direction AD1. In some embodiments, radially inward facing surface 264 is curvilinear (i.e., radially inward facing surface 264 non-linearly decreases in diameter in axial direction AD1). Radially inward facing surface 274 comprises a substantially constant diameter. As previously discussed, housing 266 is arranged to engage hole 32 of lid 20 to non-rotatably connect lid 20 to housing 266. Specifically, notches 268 are arranged to engage protrusions of hole 32 to create the non-rotatable connection. Notches 268 extend axially along radially outward facing surface 266, thereby allowing axial movement of lid 20 relative to housing 260. Flange 270 limits the axial movement of lid 20 relative to housing 260, as shown in FIG. 4 (i.e., flange 370 of friction bearing 300 is substantially similar to flange 270 of friction bearing 200). In some embodiments, housing 260 is fixedly secured to lid 20.

Sleeve 250B comprises through-bore 252B, surface 254B, surface 256B, and radially outward facing surface 258B. When assembled, through-bore 252B is arranged to engage section 242. Radially outward facing surface 258B comprises a generally constant diameter and is concentrically arranged within radially inward facing surface 274, as shown in FIG. 9.

Washer 276 comprises hole 278 having one or more flats 280, surface 282, and surface 286. Flats 280 are arranged to engage flats 248 to non-rotatably connect washer 276 and shaft 230.

Disc spring 288 comprises through-bore 290, surface 292, and surface 294. Disc spring 288 is a conical shell which can be loaded along its axis either statically or dynamically, also known as a Belleville washer, a coned-disc spring, conical spring washer, Belleville spring, or cupped spring washer. Specifically, disc spring 288 is a type of spring shaped like a washer having a frusto-conical shape that gives it its characteristic spring. Surface 292 engages surface 286 and surface 294 engages head 204B. Disc spring 288 provides continuous axial force to friction bearing 200 to maintain the non-rotatable connection between the relevant components of friction bearing 200.

Bolt 202B generally comprises head 204B and threading 206B. Threading 206B is arranged to extend through through-bore 290 of disc spring 288 and hole 278 of washer 276 and engage threading of hole 246. In some embodiments, bolt 202B engages hole 246 via press or interference fit.

When friction bearing 200 is assembled, washer 276, friction cone 250A, shaft 230, spacer 212, and base 40 are non-rotatably connected. Additionally, when friction bearing 200 is assembled, housing 260 and lid 20 are non-rotatably connected. The purpose of friction bearing 200 to make adjustable or further control the rate of displacement of lid 20 relative to base 40. Specifically, friction bearing 200 acts as an adjustable clutch to limit the rotational speed of lid 20 to base 40. As shown in FIG. 9, radially outward facing surface 258A engages radially inward facing surface 264 thereby creating friction between friction cone 250A and housing 260. As bolt 202B is tightened, pressure created in friction bearing 200 forces, for example, friction cone 250A in axial direction AD1, relative to housing 260, creating more friction between radially outward facing surface 258A and radially inward facing surfaces 264, and limiting the rate of displacement of lid 20 relative to base 40. Oppositely, as bolt 202B is loosened, pressure in friction bearing 200 is decreased creating less friction between radially outward facing surface 258A and radially inward facing surface 264, and allowing for an increased rate of displacement of lid 20 relative to base 40. Friction bearing 200 is advantageous especially for cover assemblies having very dense or heavy covers, which upon opening, may be very difficult to control.

Figure 11:
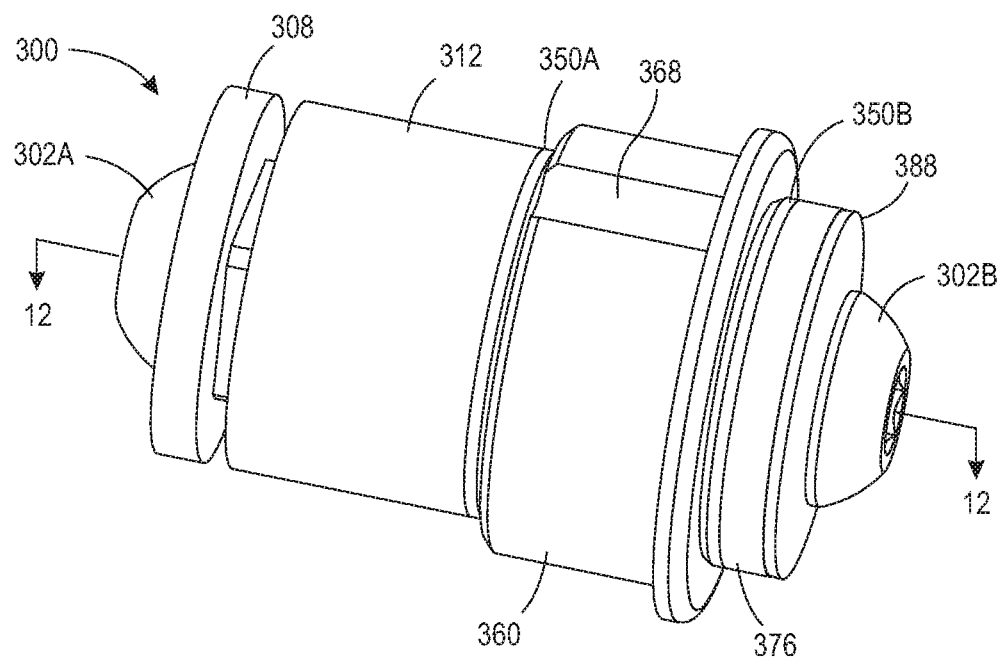
FIG. 11 is a perspective view of a friction bearing.
Figure 12:
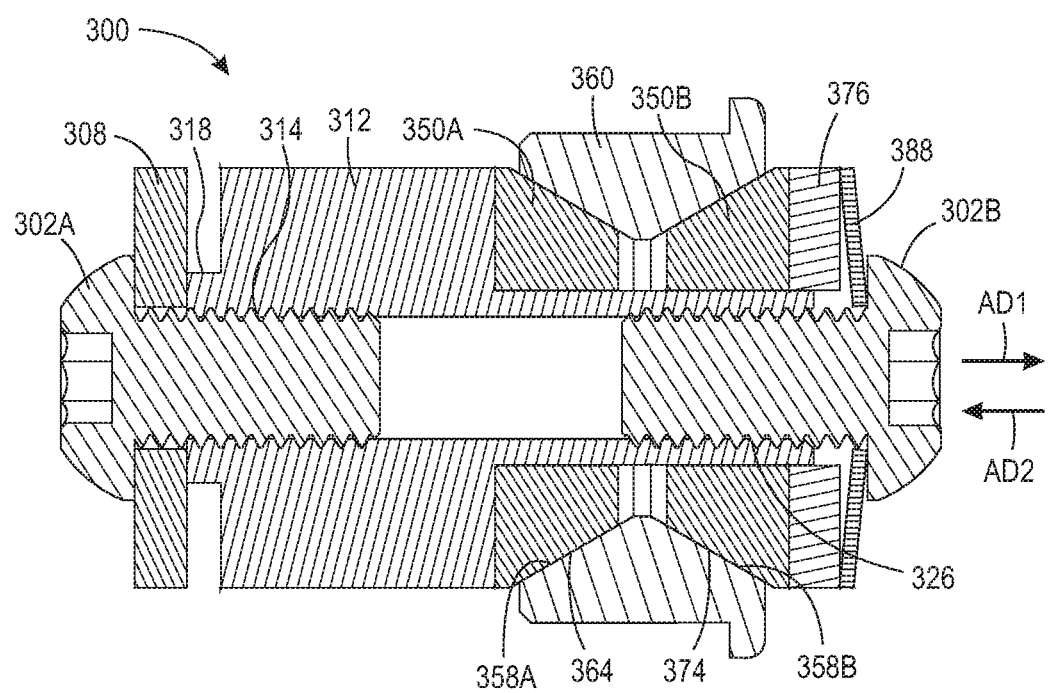
FIG. 12 is a cross-sectional view of the friction bearing taken generally along line 12-12 in FIG. 11.
Figure 13A:
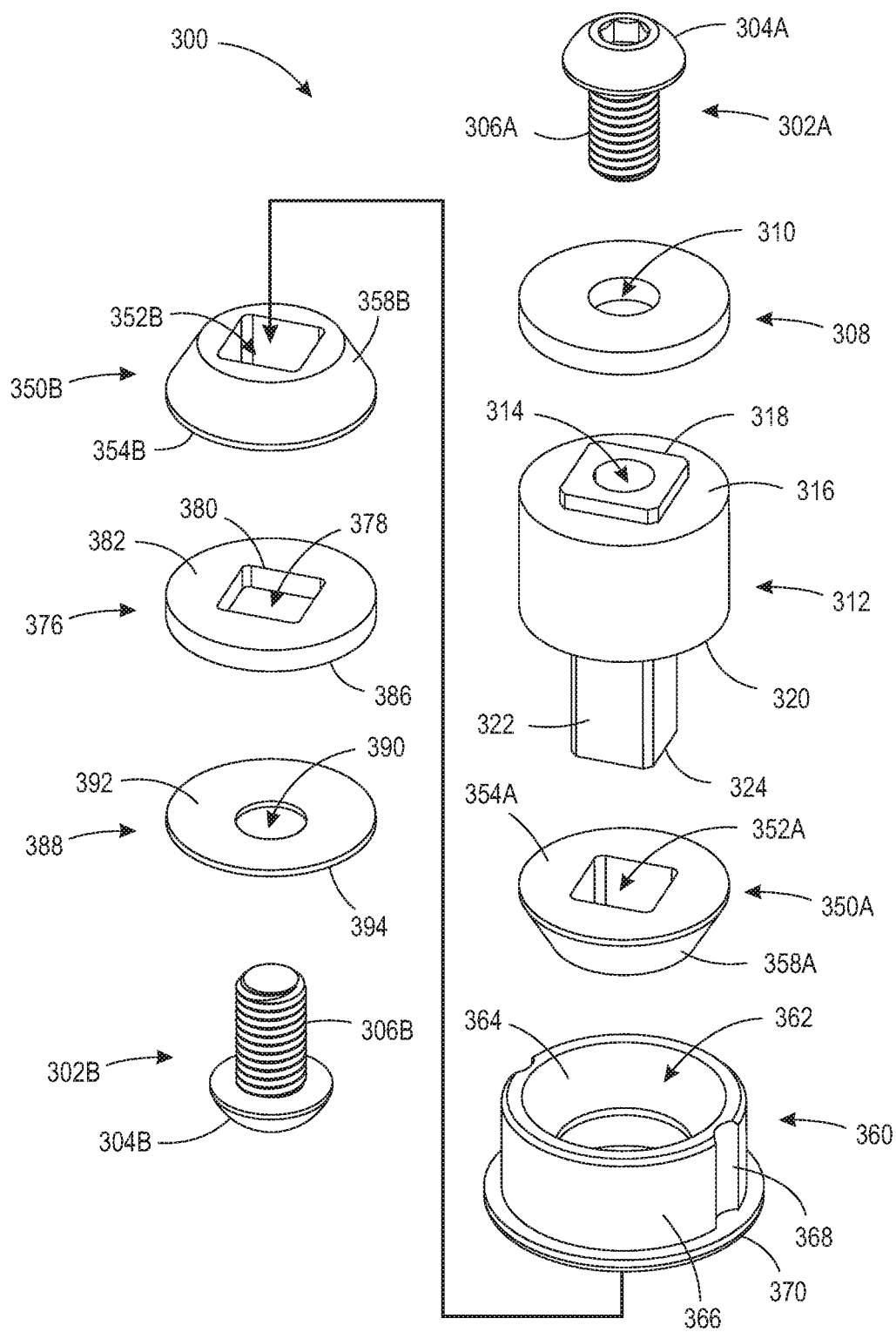
FIG. 13A is an exploded front perspective view of the friction bearing shown in FIG. 11.
Figure 13B:
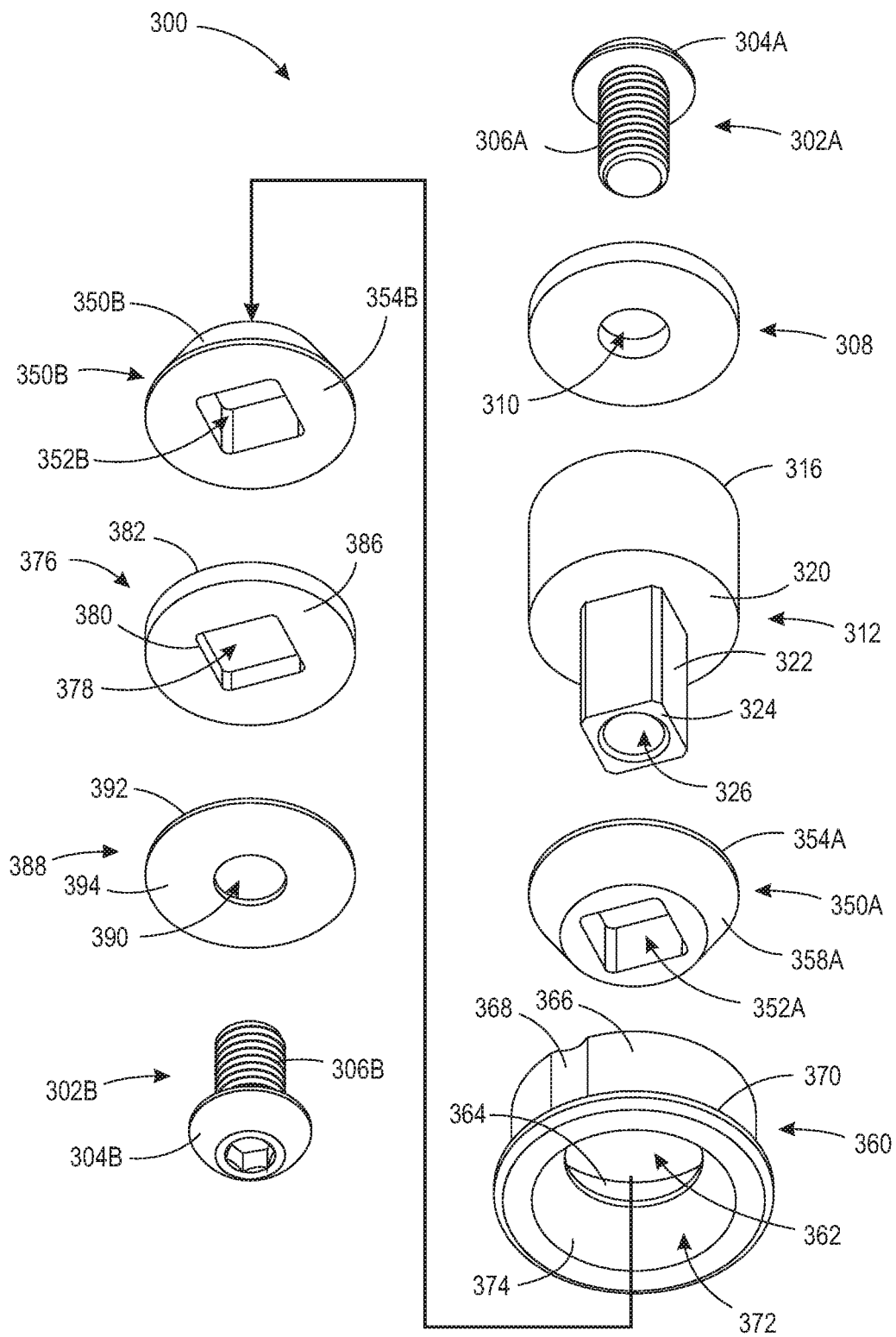
FIG. 13B is an exploded rear perspective view of the friction bearing shown in FIG. 11.

FIG. 11 is a perspective view of friction bearing 300. FIG. 12 is a cross-sectional view of friction bearing 300 taken generally along line 12-12 in FIG. 11. FIG. 13A is an exploded front perspective view of friction bearing 300. FIG. 13B is an exploded rear perspective view of friction bearing 300. Friction bearing 300 generally comprises bolt 302A, washer 308, spacer 312, friction cone 350A, housing 360, friction cone 350B, washer 376, disc spring 388, and bolt 302B. The following descriptions should be read in view of FIGS. 11-13B.

Bolt 302A generally comprises head 304A and threading 306A. Threading 306A is arranged to extend through through-bore 310 of washer 308 and engage threading of hole 314.

Spacer 312 generally comprises hole 314, surface 316, protrusion 318 extending from surface 316, surface 320, section 322, surface 324, and hole 326. As previously discussed, protrusion 318 engages hole 50 (e.g., having a square geometry) of base 40 to non-rotatably connect spacer 312 to base 40. Bolt 302A and washer 308 axially secure or clamp spacer 312 to side 44. Hole 314 may comprise threading arranged to engage threading 306A of bolt 302A. In some embodiments, bolt 302A engages hole 314 via press or interference fit. Hole 326 comprises threading arranged to engage threading 306B of bolt 302B. Section 322 comprises a generally square geometry and is fixedly secured to surface 320. It should be appreciated that section 322 may comprise any geometry suitable to non-rotatably connect friction cones 350A-B and washer 376 to spacer 312. In some embodiments, section 322 may comprise a circular geometry including one or more flats circumferentially arranged thereon proximate surface 324.

Friction cone 350A comprises hole 352A, surface 354A, and radially outward facing surface 358A. When assembled, hole 352A is arranged to engage section 322 to non-rotatably connect friction cone 350A with spacer 312 and base 40. Radially outward facing surface 358A is frusto-conical. Specifically, as shown in FIG. 12, radially outward facing surface 358A linearly decreases in diameter in axial direction AD1. In some embodiments, radially outward facing surface 358A is curvilinear (i.e., non-linearly decreases in diameter in axial direction AD1). In the embodiment shown, hole 352A comprises a square geometry, which is operatively arranged to engage the square geometry of section 322 to non-rotatably connect friction cone 350A and spacer 312; however, it should be appreciated that any suitable geometry may be used, for example, rectangular, triangular, ovular, ellipsoidal, as well as any suitable arrangement of one or more notches engaging one or more grooves. In some embodiments, friction cone 350A is arranged at least partially on a first axial side of housing 360 and disc spring 388 is arranged on a second axial side of housing 360, opposite the first axial side.

Housing 360 comprises hole 362, radially inward facing surface 364, radially outward facing surface 366, one or more notches 368 circumferentially arranged on radially outward facing surface 366, flange 370, hole 372, and radially inward facing surface 374. Radially inward facing surfaces 364 and 374 are frusto-conical. Specifically, as shown in FIG. 12, radially inward facing surface 364 linearly decreases in diameter in axial direction AD1 and radially inward facing surface 374 linearly increases in diameter in axial direction AD1. In some embodiments, radially inward facing surfaces 364 and 374 are curvilinear (i.e., radially inward facing surface 364 non-linearly decreases in diameter in axial direction AD1 and radially inward facing surface 374 non-linearly increases in diameter in axial direction AD1). As previously discussed, housing 366 is arranged to engage hole 32 of lid 20 to non-rotatably connect lid 20 to housing 366. Specifically, notches 368 are arranged to engage protrusions of hole 32 to create the non-rotatable connection. Notches 368 extend axially along radially outward facing surface 366, thereby allowing axial movement of lid 20 relative to housing 360. Flange 370 limits the axial movement of lid 20 relative to housing 360, as shown in FIG. 4. In some embodiments, housing 360 is fixedly secured to lid 20.

Friction cone 350B comprises hole 352B, surface 354B, and radially outward facing surface 358B. When assembled, hole 352B is arranged to engage section 322. Radially outward facing surface 358B is frusto-conical. Specifically, as shown in FIG. 12, radially outward facing surface 358B linearly increases in diameter in axial direction AD1. In some embodiments, radially outward facing surface 358B is curvilinear (i.e., non-linearly increases in diameter in axial direction AD1). In the embodiment shown, hole 352B comprises a square geometry, which is operatively arranged to engage the square geometry of section 322 to non-rotatably connect friction cone 350B and spacer 312; however, it should be appreciated that any suitable geometry may be used, for example, rectangular, triangular, ovular, ellipsoidal, as well as any suitable arrangement of one or more notches engaging one or more grooves.

Washer 376 comprises hole 378 having one or more flats 380, surface 382, and surface 386. Flats 380 are arranged to engage the flats of section 322 to non-rotatably connect washer 376 and spacer 312. In the embodiment shown, hole 378 comprises a square geometry, which is operatively arranged to engage the square geometry of section 322 to non-rotatably connect washer 376 and spacer 312; however, it should be appreciated that any suitable geometry may be used, for example, rectangular, triangular, ovular, ellipsoidal, as well as any suitable arrangement of one or more notches engaging one or more grooves.

Disc spring 388 comprises through-bore 390, surface 392, and surface 394. Disc spring 388 is a conical shell which can be loaded along its axis either statically or dynamically, also known as a Belleville washer, a coned-disc spring, conical spring washer, Belleville spring, or cupped spring washer. Specifically, disc spring 388 is a type of spring shaped like a washer having a frusto-conical shape that gives it its characteristic spring. Surface 392 engages surface 386 and surface 394 engages head 304B. Disc spring 388 provides continuous axial force to friction bearing 300 to maintain the non-rotatable connection between the relevant components of friction bearing 300.

Bolt 302B generally comprises head 304B and threading 306B. Threading 306B is arranged to extend through through-bore 390 of disc spring 388 and hole 378 of washer 376 and engage threading of hole 326. In some embodiments, bolt 302B engages hole 326 via press or interference fit.

When friction bearing 300 is assembled, washer 376, friction cone 350B, friction cone 350A, spacer 312, and base 40 are non-rotatably connected. Additionally, when friction bearing 300 is assembled, housing 360 and lid 20 are non-rotatably connected. The purpose of friction bearing 300 to make adjustable or further control the rate of displacement of lid 20 relative to base 40. Specifically, friction bearing 300 acts as an adjustable clutch to limit the rotational speed of lid 20 to base 40. As shown in FIG. 12, radially outward facing surface 358A engages radially inward facing surface 364 and radially outward facing surface 358B engages radially inward facing surface 374 thereby creating friction between friction cones 350A-B and housing 360. As bolt 302B is tightened, pressure created in friction bearing 300 forces, for example, friction cone 350A in axial direction AD1 and friction cone 350B in axial direction AD2, relative to housing 360, creating more friction between radially outward facing surfaces 358A-B and radially inward facing surfaces 364 and 374, respectively, and limiting the rate of displacement of lid 20 relative to base 40. Oppositely, as bolt 302B is loosened, pressure in friction bearing 300 is decreased creating less friction between radially outward facing surfaces 358A-B and radially inward facing surfaces 364 and 374, respectively, and allowing for an increased rate of displacement of lid 20 relative to base 40. Friction bearing 300 is advantageous especially for cover assemblies having very dense or heavy covers, which upon opening, may be very difficult to control.

Figure 14:
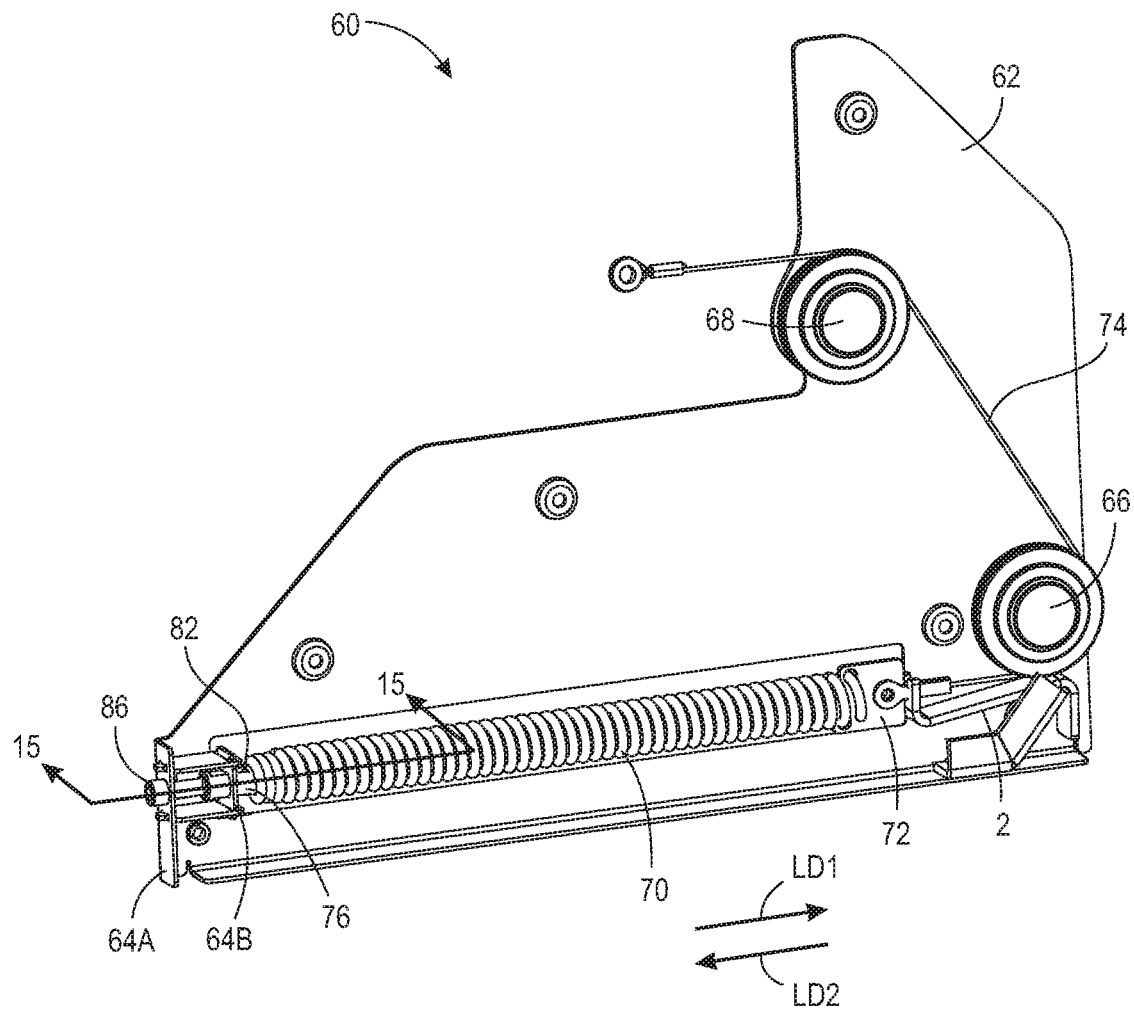
FIG. 14 is a perspective view of a lid assist assembly as shown in FIG. 1; and, FIG. 15 is a cross-sectional view of the lid assist assembly taken generally along line 15-15 in FIG. 14.
Figure 15:
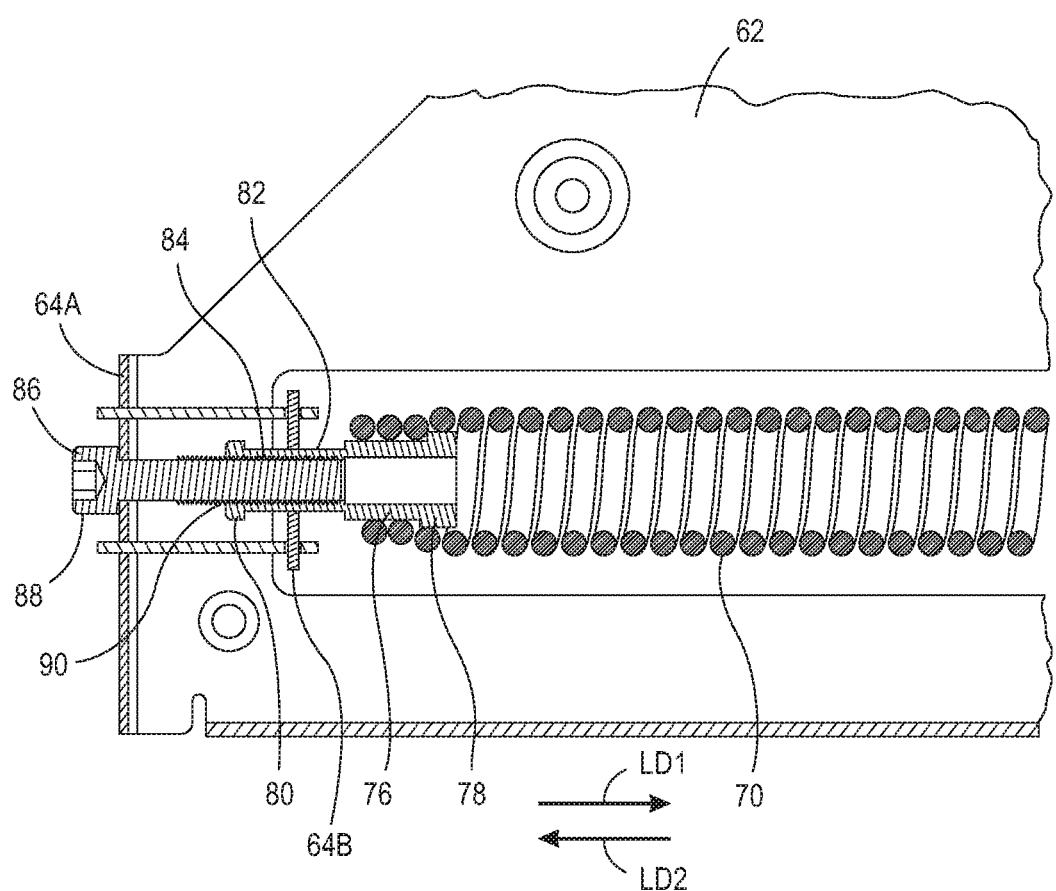

FIG. 14 is a perspective view of lid assist assembly 60. FIG. 15 is a cross-sectional view of lid assist assembly 60 taken generally along line 15-15 in FIG. 14. Lid assist assembly 60 generally comprises plate 62, pulleys 66 and 68, spring 70, and cable 74. It should be appreciated that lid assist assembly 60A, as shown in FIG. 2, is a mirror image of lid assist assembly 60. The following descriptions should be read in view of FIGS. 1-4 and 14-15.

Plate 62 generally comprises flange 64A and 64B. Plate 62 is arranged to be fixedly secured to side 44 of base 40. Pulleys 66 and 68 are rotatably connected to plate 62. Spring 70 is connected to plate 62 via spring nut 76 and to lid 20 via spring end plate 72 and cable 74. Specifically, spring end plate 72 is connected to a first end of spring 70. Cable 74 is fixedly secured to spring end plate 72 at a first end. Cable 74 at least partially engages pulleys 66 and 68 and is connected to lid 20 via pivot 36 at a second end. In some embodiments, lid assist assembly 60 comprises one or more pulleys.

Spring nut 76 comprises end 78, end 80, one or more notches 82, and hole 84. End 78 is connected to a second end of spring 70. Spring nut 76 extends through a hole in flange 64B with end 80 axially arranged between flange 64A and flange 64B. Notches 82 are generally flats arranged on spring nut 76 that engage the hole in flange 64B. Ends 78 and 80 act as flanges to limit the axial displacement of spring nut 76 relative to flange 64B. Hole 84 is arranged in end 80 and comprises threading.

Bolt 86 comprises head 88 and threading 90. Threading 90 is arranged to extend through a hole in flange 64A and engage the threading of hole 84. Bolt 86 allows the tension of spring 70 to be adjusted. For example, as bolt 86 is tightened, spring nut 76 is displaced in longitudinal direction LD2, thereby adding tension to spring 70. Such action would make it easier to open or rotate lid 20 with respect to base 40. As bolt 86 is loosened, spring nut 76 is displaced in longitudinal direction LD1, thereby removing tension to spring 70.

As lid 20 is opened, spring end plate 72 is displaced in longitudinal direction LD2 thereby releasing tension in spring 70. Subsequently, as lid 20 is closed, spring end plate 72 is displaced in longitudinal direction LD1 thereby creating tension in spring 70 (i.e., reloading the spring lid open assist). Cover assembly 10 is capable of being in an open position and a closed position. In an open position, lid 20 is rotated relative to base 40 such that a user can access the interior thereof, specifically, grill 48. In a closed position, lid 20 is rotated relative to base 40 such that a user cannot access the interior thereof, trapping heat within cover assembly 10. Cover assembly 10, as shown in FIGS. 1-3 is shown in a partially open position. In the fully open position, lid 20, specifically side 24, abuts against stopper 54 and side 26 abuts against stopper 56. It should further be appreciated that shipping latch 2 is provided to limit movement of cable 74 (i.e., the displacement of spring end plate 72 in longitudinal direction LD1 or LD2) during the shipping of cover assembly 10. Shipping latch 2 is arranged to be disengaged once cover assembly 10 has been delivered and can be re-engaged at a later time if desired.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

REFERENCE NUMERALS

2 Shipping latch
10 Cover assembly
20 Lid
22 Top
24 Side
26 Side
28 Handle
30 Indentation
32 Hole
34 Hole
36 Pivot
40 Base
42 Back
44 Side
46 Side
48 Grill
50 Hole
52 Hole
54 Stopper
56 Stopper
60 Lid assist assembly
60A Lid assist assembly
62 Plate
64A Flange
64B Flange
66 Pulley
68 Pulley
70 Spring
72 Spring end plate
74 Cable
76 Spring nut
78 End
80 End
82 Notch
84 Hole
86 Bolt
88 Head 90 Threading
100 Friction bearing
102A Bolt
102B Bolt
104A Head
104B Head
106A Threading
106B Threading
108 Washer
110 Through-bore
112 Spacer
114 Through-bore
116 Surface
118 Protrusion
120 Surface
122 Hole
124 Surface
126 Hole
128 Surface
130 Shaft
132 Hole
134 Surface
136 Protrusion
138 Surface
140 Protrusion (or protrusions)
142 Section
144 Surface
146 Hole
148 Flat (or flats)
150A Friction cone
150B Friction cone
152A Through-bore
152B Through-bore
154A Surface
154B Surface
156A Notch (or notches)
156B Notch (or notches)
158A Radially outward facing surface
158B Surface
160 Housing
162 Hole
164 Radially inward facing surface
166 Radially outward facing surface
168 Notch (or notches)
170 Flange
172 Hole
174 Radially inward facing surface
176 Washer
178 Hole
180 Flat (or flats)
182 Surface
184 Protrusion (or protrusions)
186 Surface
188 Disc spring
190 Through-bore
192 Surface
194 Surface
200 Friction bearing
202A Bolt
202B Bolt
204A Head
204B Head
206A Threading
206B Threading
208 Washer
210 Through-bore
212 Spacer
214 Through-bore
216 Surface
218 Protrusion
220 Surface
222 Hole
224 Surface
226 Hole
228 Surface
230 Shaft
232 Hole
234 Surface
236 Protrusion
238 Surface
240 Protrusion (or protrusions)
242 Section
244 Surface
246 Hole
248 Flat (or flats)
250A Friction cone
250B Sleeve
252A Through-bore
252B Through-bore
254A Surface
254B Surface
256A Notch (or notches)
256B Surface
258A Radially outward facing surface
258B Radially outward facing surface
260 Housing
262 Hole
264 Radially inward facing surface
266 Radially outward facing surface
268 Notch (or notches)
270 Flange
272 Hole
274 Radially inward facing surface
276 Washer
278 Hole
280 Flat (or flats)
282 Surface
286 Surface
288 Disc spring
290 Through-bore
292 Surface
294 Surface
300 Friction bearing
302A Bolt
302B Bolt
304A Head
304B Head
306A Threading
306B Threading
308 Washer
310 Through-bore
312 Spacer
314 Hole
316 Surface
318 Protrusion
320 Surface
322 Section
324 Surface
326 Hole
350A Friction cone
350B Friction cone
352A Hole
352B Hole
354A Surface 354B Surface
358A Surface
358B Surface
360 Housing
362 Hole
364 Radially inward facing surface
366 Radially outward facing surface
368 Notch (or notches)
370 Flange
372 Hole
374 Radially inward facing surface
376 Washer
378 Hole
380 Flat (or flats)
382 Surface
386 Surface
388 Disc spring
390 Through-bore
392 Surface
394 Surface
AD1 Axial direction
AD2 Axial direction

What is claimed is:

1. A friction bearing for hingedly connecting a first component to a second component, comprising:
 a spacer arranged to be non-rotatably connected to the first component;
 a first friction cone non-rotatably connected to the spacer;
 a housing arranged to engage the first friction cone and be non-rotatably connected to the second component; and,
 a disc spring operatively engaged with the first friction cone and arranged to provide an axial force on the first friction cone toward the housing.

2. The friction bearing as recited in claim 1, further comprising a second friction cone non-rotatably connected to the spacer, the second friction cone arranged to engage the housing.

3. The friction bearing as recited in claim 2, wherein the housing comprises:
 a first radially inward facing surface arranged to engage a first radially outward facing surface of the first friction cone; and,
 a second radially inward facing surface arranged to engage a second radially outward facing surface of the second friction cone.

4. The friction bearing as recited in claim 3, wherein the first and second radially inward facing surfaces and the first and second radially outward facing surfaces are frusto-conical.

5. The friction bearing as recited in claim 1, wherein the housing comprises a first radially inward facing surface arranged to engage a first radially outward facing surface of the first friction cone.

6. The friction bearing as recited in claim 5, wherein the first radially inward facing surface and the first radially outward facing surface are frusto-conical.

7. The friction bearing as recited in claim 1, further comprising a shaft non-rotatably connected to the spacer, wherein the first friction cone and the housing are arranged on the shaft.

8. The friction bearing as recited in claim 7, wherein the shaft and the spacer are integrally formed.

9. The friction bearing as recited in claim 1, further comprising a bolt operatively arranged to engage the spacer, wherein:
 tightening the bolt increases frictional engagement between the first friction cone and the housing; and,
 loosening the bolt decreases frictional engagement between the first friction cone and the housing.

10. A cover assembly, comprising:
 a base; and,
 a lid rotatably connected to the base via a friction bearing, the friction bearing comprising:
  a spacer arranged to be non-rotatably connected to the base;
  a first friction cone non-rotatably connected to the spacer;
  a housing arranged to engage the first friction cone and be non-rotatably connected to the lid; and,
  a disc spring operatively engaged with the first friction cone and arranged to provide an axial force on the first friction cone toward the housing.

11. The cover assembly as recited in claim 10, further comprising a second friction cone non-rotatably connected to the spacer, the second friction cone arranged to engage the housing.

12. The cover assembly as recited in claim 11, wherein the housing comprises:
 a first radially inward facing surface arranged to engage a first radially outward facing surface of the first friction cone; and,
 a second radially inward facing surface arranged to engage a second radially outward facing surface of the second friction cone.

13. The cover assembly as recited in claim 12, wherein the first and second radially inward facing surfaces and the first and second radially outward facing surfaces are frusto-conical.

14. The cover assembly as recited in claim 10, wherein the housing comprises a first radially inward facing surface arranged to engage a first radially outward facing surface of the first friction cone.

15. The cover assembly as recited in claim 14, wherein the first radially inward facing surface and the first radially outward facing surface are frusto-conical.

16. The cover assembly as recited in claim 10, further comprising a shaft non-rotatably connected to the spacer, wherein the first friction cone and the housing are arranged on the shaft.

17. The cover assembly as recited in claim 16, wherein the shaft and the spacer are integrally formed.

18. The cover assembly as recited in claim 10, further comprising a bolt operatively arranged to engage the spacer, wherein:
 tightening the bolt increases frictional engagement between the first friction cone and the housing; and,
 loosening the bolt decreases frictional engagement between the first friction cone and the housing.

19. The cover assembly as recited in claim 10, further comprising a lid assist assembly including:
 a spring having a first end connected to the base and a second end; and,
 a cable having a third end connected to the second end and a fourth end connected to the lid;
 wherein the lid assist assembly provides tension on the lid toward an open position.

20. The cover assembly as recited in claim 19, wherein the lid assist assembly further comprises a spring nut that connects the first end to the base, wherein the spring nut is operatively arranged to adjust a tension in the spring.

* * * * *